M. HORIE.
CAMERA SELF TIMER.
APPLICATION FILED MAY 22, 1919.
1,333,918. Patented Mar. 16, 1920.
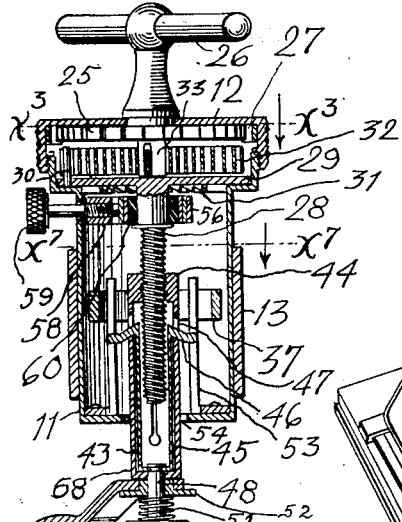
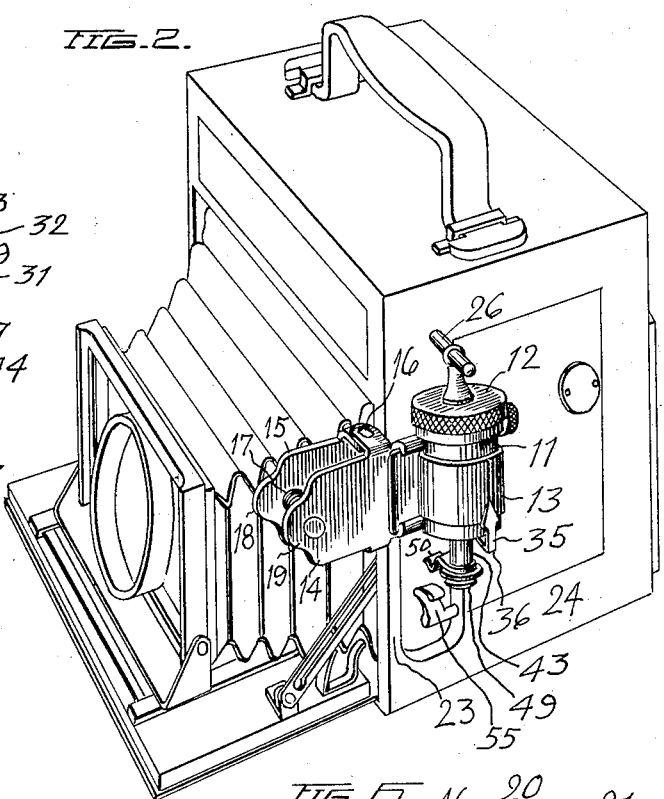
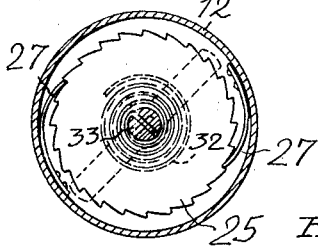
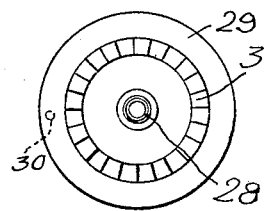
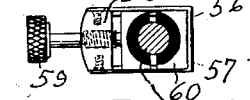
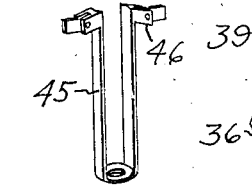
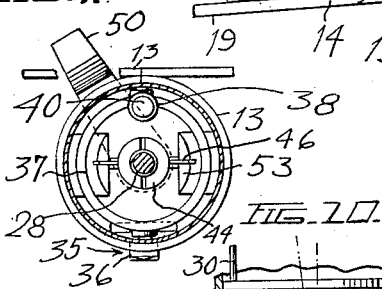
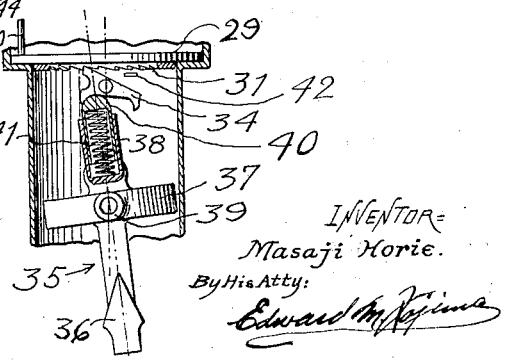
INVENTOR:
Masaji Horie.
By his Atty:
Edward M. Fujima

UNITED STATES PATENT OFFICE.

MASAJI HORIE, OF LOS ANGELES, CALIFORNIA.

CAMERA SELF-TIMER.

1,333,918.  Specification of Letters Patent.  Patented Mar. 16, 1920.

Application filed May 22, 1919. Serial No. 298,981.

*To all whom it may concern:*

Be it known that I, MASAJI HORIE, a subject of the Emperor of Japan, residing at Los Angeles, in the county of Los Angeles and State of California, have invented a new and useful Improvement in Camera Self-Timers, of which the following is a specification.

This invention relates to improved means for tripping a camera shutter, whereby an interval of from ten seconds to three minutes will elapse between release of the timer and its action in tripping the shutter on the camera.

The object of the invention is to time the tripping of the camera shutter to occur after an interval of time, to enable the photographer to be included in the photograph that is taken by the camera.

Another object of the invention is to provide a timer which may be quickly attached to and detached from the camera, and which may be attached to the camera in different positions relative to the shutter release lever, and to provide a timer which may be operated with a cord or cable.

Other objects and advantages may appear in the subjoined detail description.

Upon the annexed drawings, Figure 1 is a sectional view of my improved timing device. Fig. 2 is a perspective view of a camera with my timing device applied thereto. Fig. 3 is a transverse section of the casing cover, taken on the line $X^3$—$X^3$, of Fig. 1. Fig. 4 is a bottom plan view of the actuating screw. Fig. 5 is a plan view of the brake. Fig. 6 is a top plan view of the timer. Fig. 7 is a transverse section taken on line $X^7$—$X^7$ of Fig. 1. Fig. 8 is a perspective detail view of the clamp for the operating nut. Fig. 9 is a perspective detail view of the release lever for the timer. Fig. 10 is a fragmentary view showing the ratchet screw-head, releasing pawl, and lever.

Referring to the drawings, the timing device consists of the casing 11 provided with a cover 12, and a securing member 13. The member 13 is secured to clamp member 14. Clamp members 14 and 15 are pivotally connected to the pintle member 16, and are maintained in opposed relation by the spring 17 interposed between the extremities 18 and 19. The respective opposite extremities or jaws 20 and 21, of the clamp members, are adapted to engage with the walls 22 and 23, of the camera 24, when open for an exposure.

The cover 12 is provided with a rotatively mounted ratchet 25, which is operated by turning the handle 26 in a clockwise direction. Spring ratchet members 27 prevent rotation of member 25 in the contrary direction. The screw 28 is provided with a head 29 having an integral pin 30 projecting from the top, and with ratchet teeth 31 projecting from the bottom of the head. The main spring 32 is connected at the outer end to pin 30, on the enlarged screw head 29, and connected at the inner end to shaft 33, integral with and projecting from ratchet 25. A pawl 34 is normally in engagement with ratchet teeth 31 and prevents rotation of the screw 28. The release lever 35, comprising the arm 36 projecting from the casing, the ring 37, and the socket arm 38, is pivotally mounted within the casing, having the oppositely disposed trunnions 39, and a plunger 40, mounted in socket arm 38. A spring 41 holds plunger 40 in engagement with pawl 34. When the lever is in the operative position, the plunger holds pawl 34 in engagement with the ratchet head 29, and when the lever is in the opposite position, the pawl 34 is in engagement with a lug 42, projecting from casing 11.

A hollow and split plunger 43, is formed with a threaded head or nut 44, in engagement with screw 28. A clamp 45 extends through plunger 43, and the jaws 46, extend through slots 47 in the plunger. A shaft 48, fixed to clamp member 45, extends through the lower end 68, of plunger 43, and is provided with a head 49. A trip lever 50 is swivelly mounted on the shaft 48, and may be set in any position relative to the plunger 43. A spring 51 is interposed between the head 49 and the washer 52 which presses upon the lever 50. Spring 51 tends to force the clamp jaws 46 against the lower beveled and inclined faces of slots 47, and therefore locks the threaded head 44 in engagement with screw 28. The clamp jaws 46 extend between the guides 53, serving to prevent rotation of the plunger 43. The opening 54, through which the plunger 43 extends, is of greater diameter one way, serving to allow the split head 44 to slide as a ratchet over the screw 28 when pressed upward by the operator.

In use, the device is clamped to the camera adjacent to the lever 55 which serves to trip the shutter. The head 49 is pressed by the operator, which forces the clamp 45 upward, releasing the split head 44 from engagement with the screw 28, and the plunger 43 is forced to the uppermost position. The lever 35 is shifted to the position as shown in Fig. 10, thereby forcing the pawl 34 in engagement with ratchet screw head 29. The handle 26 is turned to wind the main spring, and the device is set for use. A brake 56, consisting of the yoke 57, the nut 58, and screw 59, adapted to force the brake shoes 60 against the cylindrical portion 61, of the screw 28, is adjusted to regulate the speed of the screw. This may be done by turning the screw 59. The device is further adjusted by clamping the same relatively nearer to or farther from the shutter trip lever. The operator releases the device by manipulating the lever 35, and may then take a position to be photographed by the camera. Lever 35 may be operated by a cable.

From the foregoing description, it may be seen that I have provided simple and efficient means for timing the release of the camera shutter, the invention not being limited to the precise construction shown, but including such changes and alterations as may fall within the scope of the appended claims.

What is claimed is:

1. In a camera timer, the combination with a casing, of a cover for the casing, a ratchet wheel rotatively mounted in the cover, a handle projecting from the cover and adapted to wind the ratchet wheel with a clockwise movement, a screw extending centrally within the casing, a circular head on the screw, a pin projecting from the top of the circular head, a spring having one extremity connected to the pin and the opposite and inner end connected to the ratchet wheel, a plunger working longitudinally within the casing, a split screw head on the plunger, a shutter trip lever swivelly mounted in the opposite end of the plunger, means to prevent rotation of the plunger, ratchet teeth on the bottom of the screw head, a pawl in engagement with the ratchet teeth, and a lever to release the pawl, and extending from the casing.

2. A casing, means for attaching the casing to a camera adjacent to the shutter trip, a plunger projecting from the casing, an arm swivelly connected to the plunger and adapted to operate the shutter trip, a screw to actuate the plunger, and means for actuating the screw with a rotary movement.

3. In a camera timer, the combination with a casing, of a ratchet-wheel rotatively mounted therein, a handle projecting from the casing and integral with the ratchet-wheel, spring pawls arranged to prevent rotation of the ratchet-wheel in a counter-clockwise direction, a screw disposed centrally within the casing, a circular head for the screw, a pin projecting from the screw-head, a main spring having one extremity connected to the ratchet wheel and the opposite extremity connected to the pin, a plunger projecting from the casing and working longitudinally therein, a split screw head on said plunger in engagement with the screw, a clamp adapted to hold the screw head in engagement with the screw, a shaft on the clamp extending from the plunger, a head on the end of the shaft, a spring interposed between the shaft-head and the plunger, means to prevent rotation of the plunger, a trip-arm swivelly mounted on the end of the plunger projecting from the casing, pawl means to prevent rotation of the circular screw-head, and a lever projecting from the casing and adapted to move the pawl into and out of engagement with the circular screw-head.

4. In a camera timer, a plunger, a shutter-trip-arm mounted on the plunger and adapted to engage with the camera trip-lever, a casing for the plunger, means to clamp the casing to the camera adjacent to the camera trip-lever, a screw to actuate the plunger, spring means to actuate the screw, ratchet means for winding the spring to actuate the screw, means to prevent rotation of the screw, and means for releasing the screw.

5. In a camera timer, a casing, means for attaching the casing to the camera adjacent to the shutter trip lever, spring-actuated screw, a plunger projecting from the casing and adapted to actuate the shutter trip lever, a pawl to prevent rotation of the spring-actuated screw, means for manually releasing the pawl, and brake means for retarding the movement of the spring-actuated screw.

In testimony whereof I hereunto affix my signature.

MASAJI HORIE.